US009231900B2

(12) United States Patent
Majeti et al.

(10) Patent No.: US 9,231,900 B2
(45) Date of Patent: Jan. 5, 2016

(54) PRIORITY OF RECEIVED MESSAGES COMMUNICATED AMONG END USER COMMUNICATION DEVICES

(75) Inventors: Venkata C. Majeti, Naperville, IL (US); Saiprasad Pennabadi, Naperville, IL (US)

(73) Assignee: Loment, Inc., Naperville, IL (US)

( * ) Notice: Subject to any disclaimer, the term of this patent is extended or adjusted under 35 U.S.C. 154(b) by 1215 days.

(21) Appl. No.: 13/134,599

(22) Filed: Jun. 10, 2011

(65) Prior Publication Data

US 2012/0254323 A1  Oct. 4, 2012

Related U.S. Application Data

(63) Continuation-in-part of application No. 13/068,340, filed on May 9, 2011, which is a continuation-in-part of application No. 13/065,839, filed on Mar. 31, 2011.

(51) Int. Cl.
*G06F 15/16* (2006.01)
*H04L 12/58* (2006.01)

(52) U.S. Cl.
CPC ...................... *H04L 51/26* (2013.01)

(58) Field of Classification Search
CPC . H04L 12/585; H04L 12/587; H04L 12/5855; H04L 51/26; H04L 51/22
USPC ..................... 709/20, 206, 207; 713/152–201
See application file for complete search history.

(56) References Cited

U.S. PATENT DOCUMENTS

| | | | |
|---|---|---|---|
| 6,424,995 B1 * | 7/2002 | Shuman | 709/206 |
| 6,463,462 B1 | 10/2002 | Smith et al. | |
| 7,509,304 B1 * | 3/2009 | Pather et al. | 1/1 |
| 8,095,613 B1 * | 1/2012 | Perkowitz et al. | 709/207 |
| 8,738,611 B1 * | 5/2014 | Zarmer et al. | 707/723 |
| 2002/0112015 A1 | 8/2002 | Haynes | |
| 2007/0168436 A1 * | 7/2007 | Andam | 709/206 |

* cited by examiner

*Primary Examiner* — Ruolei Zong
(74) *Attorney, Agent, or Firm* — Patti & Malvone Law Group, LLC

(57) ABSTRACT

An exemplary method implemented by a first end-user communication device receives an electronic communication of a digital packet having a header segment and a user data segment, the user data segment containing a user message and a priority value A first message priority is determined by a first module of a enhanced services application program. The first message priority is based on the received priority value that defines first visual indicia representing a first priority for the user message, a plurality of different message priorities with associated different visual indicia being defined by corresponding priority values. Under the control of the first module, the user message concurrent with the first visual indicia are displayed on a screen segment of the first end-user's communication device so that the first priority assigned to the received user message is visually conveyed to the first end-user.

15 Claims, 9 Drawing Sheets

|     | 0 | 1 | 2 | 3 | 4 | 5 | 6 | 7 | 8 | 9 | 10 | 11 | 12 | 13 | 14 | 15 | 16 | 17 | 18 | 19 |
|-----|---|---|---|---|---|---|---|---|---|---|----|----|----|----|----|----|----|----|----|----|
| Ex1 | / | / | P | : | 1 | 0 | 0 | D | E | A | C  | T  | I  | V  | A  | T  | E  |    |    |    |
| Ex2 | / | / | P | : | 1 | 0 | 0 | W | I | P | E  | O  | U  | T  |    |    |    |    |    |    |
| Ex3 | / | / | P | : | 0 | 4 | 0 | H | E | L | L  | O  |    | F  | M  |    | M  | I  | K  | E  |
| Ex4 | / | / | P | : | 0 | 4 | 4 | E | 0 | 0 | 6  | H  | E  | L  | L  | O  |    | F  | M  | .... |
| Ex5 | / | / | P | : | 0 | 3 | 7 | L | 0 | 0 | 0  | 1  | 2  | 1  | M  | E  | S  | 1  | .... |    |
| Ex6 | / | / | P | : | 0 | 3 | 7 | L | 0 | 0 | 0  | 1  | 2  | 2  | M  | E  | S  | 2  | .... |    |
| Ex7 | / | / | P | : | 0 | 1 | 12 | E | 0 | 0 | 5 | 255 | L | 0  | 0  | 0  | 2  | 2  | 1  |    |
| Ex8 | / | / | P | : | 0 | 1 | 7 | L | 0 | 0 | 0  | 2  | 2  | 2  | M  | E  | S  | 2  | .... |    |
| Ex9 |   |   |   |   |   |   |   |   |   |   |    |    |    |    |    |    |    |    |    |    |

FIG. 5

| Value of byte 5 | Background Color | Specified Message Priority |
|---|---|---|
| 1 | Red | Emergency message, requires immediate attention |
| 2 | Yellow | Urgent message, requires attention soon |
| 3 | Green | Normal communication, response is expected |
| 4 | Gray | Normal communication, response is not expected |
|   | White | Public and unsecured communication |
| 5 | Red | Emergency message, requires immediate attention |
| 6 | Yellow | Urgent message, requires attention soon |
| 7 | Green | Normal communication, response is expected |
| 8 | Gray | Normal communication, response is not expected |
| 9 | Black | High Security Special Encryption/Decryption |

FIG.11

PRIORITY OF RECEIVED MESSAGES COMMUNICATED AMONG END USER COMMUNICATION DEVICES

CROSS REFERENCE TO RELATED APPLICATIONS

This application is a continuation-in-part of U.S. application, Ser. No. 13/068,340 filed May 9, 2011, and entitled MANAGEMENT FOR INFORMATION COMMUNICATED AMONG END USER COMMUNICATION DEVICES, which is a continuation-in-part of U.S. application, Ser. No. 13/065,839 filed Mar. 31, 2011, and entitled "UBIQUITOUS USER CONTROL FOR INFORMATION COMMUNICATED AMONG END USER COMMUNICATION DEVICES".

BACKGROUND

This invention relates to communications among end user communication devices and more specifically to the priority of user data processed by end user communication devices, especially but not limited to, wireless end user communication devices, which may be made by different manufacturers and/or have different operating systems.

Wireless communication devices are now prevalent throughout all developed countries of the world. Although cellular telephones are currently the most widespread, other types of wireless communication devices include personal digital assistants, laptop computers with Wi-Fi and/or telecommunication carrier communication support, and various types of "pads" that provide visual displays that are larger than conventional cellular telephones but typically smaller than the displays of a laptop computer. Wireless voice communications between mobile devices utilizing different types of communication protocols, e.g. analog, TDMA, CDMA, VOIP, etc., are supported by different telecommunication carriers which provide appropriate communication protocol interfaces/gateways to facilitate voice communications between mobile units using different communication protocols.

Various types of transport layer communication protocols are supported by wireless communication devices. For example, text messaging, short messaging service (SMS), multimedia messaging service (MMS), email such as by simple mail transfer protocol (SMTP), and instant messaging utilizing hypertext transfer protocol (HTTP) are available. Each type service is supported by a transport layer communication protocol that is part of the telecommunication signaling structure associated with the transport of user communications and the communication of telecommunication infrastructure commands and signals.

Some email client programs support setting an importance level of an email message by the message originator. For example, importance levels can be "high, normal, low". However, various email clients may not recognize an importance level originated by a different email client or may provide different types of treatment of the message than intended by the originator. In Microsoft Outlook email client the importance level determines the order in which emails are transmitted from the client, i.e. an email with a high importance level will be transmitted ahead of an email with a normal or low importance level even if the latter was stored in a holding queue ahead of the former. Also, an importance level is generally required to be processed by a server disposed in the transmission path between the originator and recipient in order to convey the importance level to the recipient. For example, a Microsoft Exchange Server transmits messages received from a Microsoft Outlook client to the corresponding destinations from a holding queue in an order based on importance level so that higher importance level messages are transmitted ahead of lower importance level messages even if the latter were received prior to the former.

SUMMARY

It is an object of this embodiment of the present invention to satisfy a need for improved message priorities.

In accord with an embodiment of the present invention, an exemplary method implemented by a first end-user communication device receives an electronic communication of a digital packet having a header segment and a user data segment, the user data segment containing a user message and a priority value A first message priority is determined by a first module of a enhanced services application program. The first message priority is based on the received priority value that defines first visual indicia representing a first priority for the user message, a plurality of different message priorities with associated different visual indicia being defined by corresponding priority values. Under the control of the first module, the user message concurrent with the first visual indicia are displayed on a screen segment of the first end-user's communication device so that the first priority assigned to the received user message is visually conveyed to the first end-user.

An embodiment of the present invention includes the end-user communication device that executes this method.

An embodiment of the present invention also includes a computer program product, comprising a computer usable tangible medium having a computer readable program code embodied therein, where the computer readable program code is adapted to be executed to implement this method.

Embodiments of the present invention further include all the steps, elements and features recited in the claims.

DESCRIPTION OF THE DRAWINGS

Features of exemplary implementations of the invention will become apparent from the description, the claims, and the accompanying drawings in which:

FIG. 5 is a table where each row represents a transmission of information in accordance with an embodiment of the present invention.

FIG. 11 is a table where each row represents a different message priority in accordance with an embodiment of the present invention.

DETAILED DESCRIPTION

Figure 1:
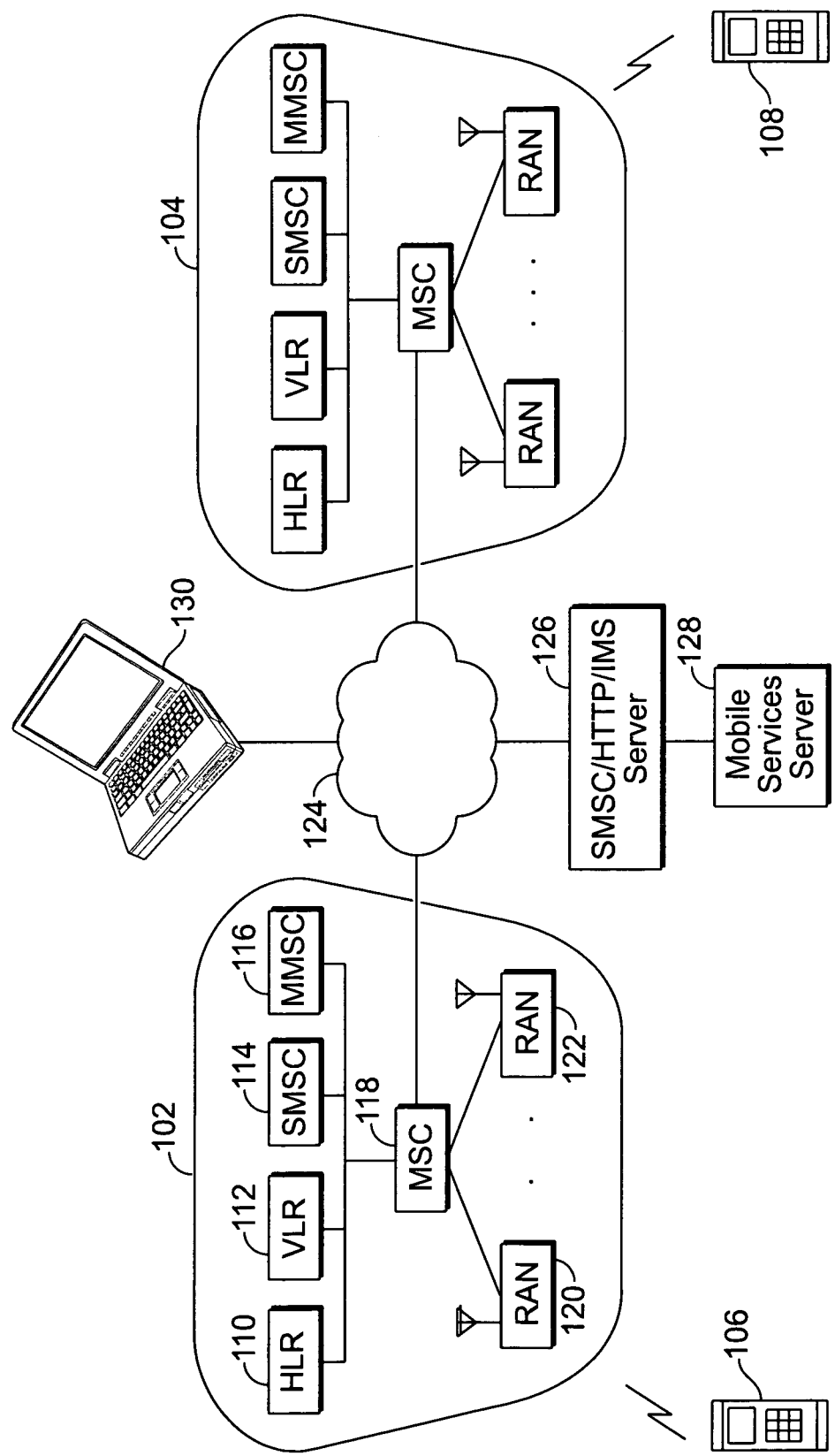
FIG. 1 is a block diagram of an illustrative communication system suited for supporting an embodiment of the present invention.

Referring to FIG. 1, wireless communication systems 102 and 104 support communications with a plurality of wireless mobile devices including exemplary wireless mobile devices (units) 106 and 108, respectively. The communication system 102 includes a home location register (HLR) 110 that serves as an operations and administration center for registered wireless mobile devices and includes information of the current location of the respective mobile devices. A visitor location register (VLR) 112 provides temporary registration and location services for wireless mobile devices located in a communication system that is not the home system for the mobile device. A short messaging service center (SMSC) 114 functions as a server for the transmission and reception of SMS messages for wireless mobile devices supported by communication system 102. A multimedia service center (MMSC) 116 provides a similar function to SMSC 114 for the transmission and reception of multimedia information for wireless mobile devices supported by communication system 102. These nodes/elements perform their known functions as part of the infrastructure that supports wireless mobile communications. A mobile switching center (MSC) 118 provides switching for voice and data communications associated with the supported wireless mobile devices. A plurality of radio access nodes (RANs) 120 and 122 provide a wireless communications link between the system 102 and the supported wireless mobile units. Each RAN is connected to the MSC 118 wherein wireless messages received from a mobile unit by a RAN are transferred to MSC 118 for further routing, and messages to be delivered to a mobile unit are transferred from the MSC 118 to a RAN where such messages are then wirelessly transmitted by the RAN to the destination mobile unit. The elements of communication system 104 are the same as elements in communication system 102 and provide the same functionality for the respective supported mobile units. Hence, the elements of communication system 104 need not be described in detail.

A communication network 124 provides a communication link between the MSCs of systems 102 and 104. Communications with an exemplary SMSC/HTTP/IMS server 126 is also supported by network 124, where HTTP means hypertext transfer protocol and IMS means Internet map server. A mobile services server 128 is supported by server 126 and facilitates enhanced capabilities for wireless mobile units in accordance with an embodiment of the present invention. For example, wireless mobile units may access and download an application program from server 128 that can be installed and operate on the wireless mobile unit to provide enhanced functionality and control of user data in accordance with an embodiment of the present invention. This will be described in greater detail below. Another end user communication device 130, which may comprise a computer or other device, is connected to the communication network 124 by other than a wireless communication link, e.g. a wire internet link through an IP service provider.

Figure 2:
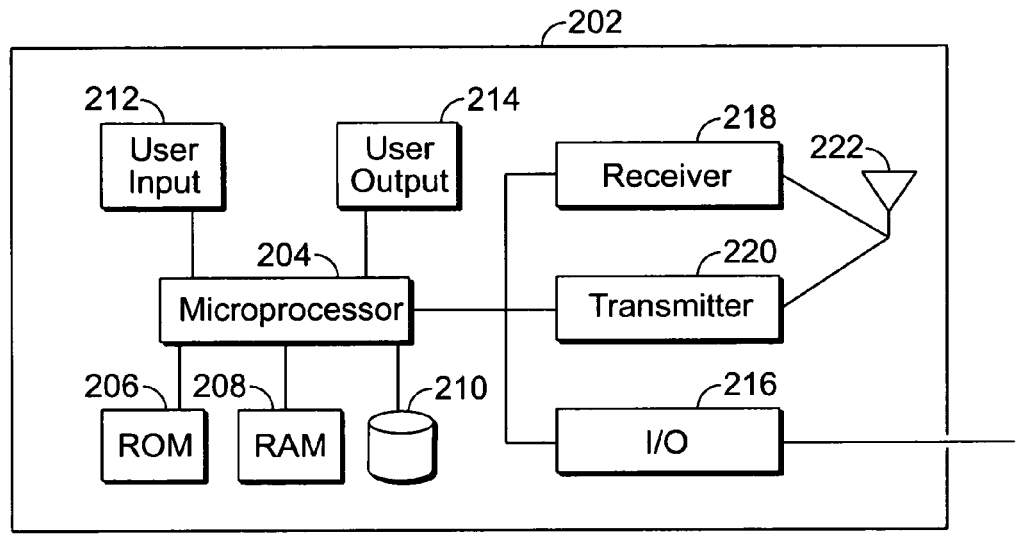
FIG. 2 is a block diagram of an exemplary device in accordance with the present invention.

FIG. 2 shows an exemplary block diagram of a device 202 which can represent mobile services server 128 or an end user wireless or wired device as explained below. A microprocessor 204 performs processes and tasks based on stored program instructions. It is supported by read-only memory (ROM) 206, random access memory (RAM) 208 and non-volatile data storage device 210. As will be understood by those skilled in the art, data and stored program instructions in ROM 206 is typically utilized by microprocessor 204 to initialize and boot the computing apparatus. An application program, e.g. a program that controls the implementation of one or more functions performed by the device, is stored in storage element 210. At least active portions of the application program will be typically stored in RAM 208 for ready access and processing by microprocessor 204. The application program is specific to the functions to be performed by the device, and performs the functions and steps as described herein. A variety of user inputs 212 such as a keyboard, keypad, touchpad and/or mouse can be utilized to control the operation of the device and the application running on it. User outputs 214, e.g. a display monitor or screen, provide output for the user of the device. An input/output (I/O) module 216 provides a communication interface permitting microprocessor 204 to transmit and receive data with external nodes. The above described elements of device 202 are utilized in a wireless mobile unit, e.g. a cellular telephone, as well as in a server, e.g. mobile services server 128, and a wired connected end user device, e.g. a personal computer.

Where device 202 represents a wireless mobile unit, a radio frequency receiver 218, transmitter 220 and an antenna 222 are also present and used for wireless communications between the unit and supporting RANs. The I/O module 216 supports communications with supporting external peripherals, e.g. USB communications with a peripheral. When device 202 represents a wireless mobile unit, the application program controlling the microprocessor 204 is supported by an operating system and includes an enhanced services (ES) application program such as downloaded from server 128 and installed in the wireless unit. In this case, the user will be the person using the wireless mobile unit. The ES application program provides the wireless mobile unit with functions as explained below.

Where device 202 represents the mobile services server 128 (where elements 218, 220 and 222 are absent), the I/O module 216 supports communications with supporting external nodes, e.g. server 126 or other nodes. In this case, the application program controlling the microprocessor 204 is supported by an operating system and includes a services support (SS) application program which supports the downloading, upon a request from a wireless unit, the ES application program from server 128 to the requesting wireless mobile unit. In this case, the user will be an administrator who maintains the operation of the server. The SS application supports the registration of wireless mobile units, and may also support the storage of user data for use in backup and restore functions with the respective wireless mobile units.

Figure 3:
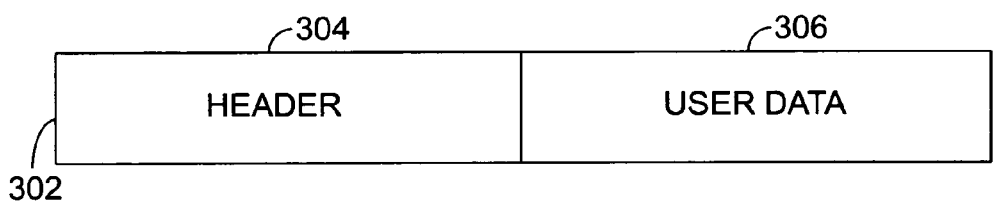
FIG. 3 illustrates a known packet structure for transmitting an SMS message.

FIG. 3 illustrates a known packet 302 used for transmitting SMS messages. Packet 302 includes a header 304 and a user data portion 306. The header 302 contains a number of fields in which data represents information and parameters that are used in the transmission, routing and processing of the packet. The header fields differ depending on whether the packet was originated from a mobile unit or is to be delivered to a mobile unit. Both types of packets include the following header information: the service center address (SCA), the protocol data unit type (PDU) that itself includes a variety of different fields, a protocol identifier (PID) that determines how the SMSC is to process the packet, the digital coding scheme (DCS) identifying the coding scheme within the user data, the user data length (UDL) that specifies the length of the user data. For packets to be delivered to a mobile, the header also contains: the originator address (OA), a service center time stamp (SCTS) identifying the time when the SMSC received the message. For packets originated from a mobile, the header also contains: a message reference (MR) that supplies a successive number that assists with reassembly of a user message that is sent using multiple packets due to its length, a destination address (DA), a validity period (VP) which identifies a time from where the message is no longer valid in the SMSC. The user data portion 306 contains a message of alphanumeric characters input by the user which is the information desired to be communication to another. As is known, the number of characters that can be contained within one user data portion 306 is limited in accordance with the data length limitation of 140 octets associated with signaling system seven (SS 7). Using 7 bit coding, 160 characters can be contained in one user data portion. However, if Unicode coding is utilized, user data portion will accommodate fewer characters as two bytes per character are used.

Figure 4:
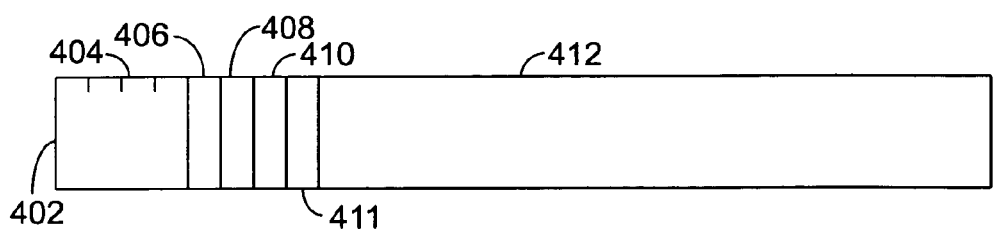
FIG. 4 illustrates a data segment having fields for containing information in accordance with an embodiment of the present invention.

FIG. 4 illustrates a data segment having a sequence of fields containing information in accordance with an embodiment of the present invention. The data segment 402 is coextensive with and resides within a user data segment 306. However, the data segment 402 contains command and control information in addition to a user input message. As will be explained in more detail below, a data segment 402 is processed by the services support application program operating on the originating and terminating wireless mobile unit wherein the command and control information is identified and processed based on predetermined command and control codes stored as part of the services support application program. Because the data segment 402 is totally encapsulated within the user data portion 306, e.g. a user data portion of an SMS message, the data segments 402 are simply treated as conventional user data by the telecommunication infrastructure nodes which pass the encapsulated data segments 402 from an originating wireless mobile unit to a terminating wireless mobile unit. Only the wireless mobile units process the data segments using the services support application program and implement actions corresponding to any command and control information contained within the data segment 402, as well as providing the user with any user message included in a user data segment.

In the exemplary embodiment, field 404 of the data segment 402 consists of four bytes which identify one of a plurality of message types in accordance with predetermined message types stored in the SS application program. In this example, field 404 contains the label "//P:" wherein the characters // and : form part of the label, and the "P" identifies a specific type of message, i.e. a Peanut message type. In this exemplary embodiment, a Peanut message type identifies the message as being a person-to-person communication. Different characters in place of the "P" in this field can be used to identify other message types where each message type is associated with different subject matter, e.g. email, banking, insurance, coupons, games, health care, etc. Field 406 consists of one byte identifying the format or coding structure. In this example, field 406 may have valid values of 0, 1 or 2 wherein 1 indicates a control message, 0 indicates a normal user message utilizing 7 bit coding, and 2 indicates a normal user message utilizing the Unicode format. Field 408 consists of one byte having a value where this value identifies the priority of the associated message assigned by the message originator that is intended to alert the recipient of the intended priority, e.g. urgency, of acting on and/or responding to the message. As will be explained, this value may also control additional aspects, e.g. encryption/decryption. Field 410 consists of one byte, i.e. a command byte, identifying the length of message parameter values and may have valid values of 0-128. The value of field 410 specifies the number of sequential bytes that are part of a control portion of the data segment, i.e. bytes before the user input data begins. Field 411 consists of a number of bytes equal to the value in field 410, e.g. 0-128, and contains name value pairs as will explained in the below examples. Field 412 contains the user input information desired to be conveyed to another party. If the length of the user input information exceeds the number of bytes available in field 412 of one data segment, the user input information can be parsed and transmitted as multiple fragments sent in a series of SMS packets containing corresponding data segments 402 with the parsed user information.

FIG. 5 is a table where each row represents an example of bytes in different data segments 402. The top row of FIG. 5 contains labels of the first 20 bytes showing the respective byte positions 0-19. A first example, Ex1, shows an exemplary control message that will be interpreted by the ES application program operating on the destination wireless mobile unit to deactivate the ES application program on the subject mobile unit. The command may be sent from the SS application program running on the server as the result of termination of registration on the subject user or as a request of the owner of the subject mobile unit since the subject handset is currently lost or stolen. Deactivation of the ES application program will prevent the ES application program from operating on the subject mobile handset, which in turn prevents usage of features and/or user data only accessible through the ES application program. Bytes 0-3, which correspond to "//P:" define the data segment 402 as being a Peanut application. The 1 value in byte 4 defines the data segment as being a control message, the 0 value in byte 6 indicates that no length of message parameter values is specified, and the 0 in byte 5 is merely a place holder in the byte sequence since there is no user message and hence no corresponding message priority to specify. Where no user message exists, the value of byte 5 is not relevant, i.e. a "don't care value". The character string "DEACTIVATE" residing in bytes 7-16 will be interpreted by the ES application program on the recipient mobile unit as a predefined command to prohibit further operation of the ES application program on the subject mobile unit.

Example 2 of FIG. 5 is a data segment similar to example 1 in that it contains a "WIPEOUT" command that will be interpreted by the ES application program on the recipient wireless mobile unit as a request to completely wipe out user data stored through the Peanut application operating under the ES application program. That is, all messages, contacts, templates and other user data stored by the Peanut application will be deleted. These first and second examples are intended to be merely representative of a variety of commands that can be utilized, e.g. "ACTIVATE" to activate a Peanut application, "CHANGEPIN <xxxx>" to permit the changing of a personal invitation number or password to the value xxxx contained in the control message, etc.

Example 3 of FIG. 5 illustrates a different type of Peanut application data segment in which the 0 value in byte 4 indicates that the data segment is a normal message type. The 0 value in byte 6 indicates that no message parameter values are specified. The value 4 in byte 5 is used to convey the priority selected by the message originator in accord with FIG. 11. This message will be displayed on the screen of the recipient's communication device with a gray background, that is, the message of alphanumeric characters is displayed on a segment of the recipient's screen in which the background color of the segment is gray. The gray background color is intended to convey to the recipient that this is a normal communication and that a response is not expected by the originator. A predefined group of background colors with corresponding message priorities is made known to all end-users so that the originator of a message can specify a corresponding message priority that will be conveyed in accordance with the present invention to the recipient. The display of different background colors for the alphanumeric characters of the message is intended as exemplary of a variety of visual indicia that could be displayed on the screen of the destination device to denote message priorities. For example, the color of the alphanumeric characters themselves, the color of a portion of the screen segment displaying a message, the color of a separate field or distinctive symbol displayed adjacent the message text/field, type or style of the alphanumeric characters, shading associated with the alphanumeric characters and/or background, or other visually distinctive appearances with corresponding priority definitions can be utilized to convey different priorities for a message. It is preferred that the priority indicia always be included when the corresponding message is displayed, e.g. it will be displayed with saved messages, messages restored from backup storage, messages transferred to another user device, messages as displayed on the originating device, etc. Also, a larger number of types of priorities can be used to convey finer distinctions of originator expectations, e.g. orange color="urgent, confirm message receipt as soon as possible"; purple color="normal message priority, reply within X hours/days", etc. As among a group of users, the group members are free to agree that the available suggested priority categories (colors) will have an understood meaning that differs from the standard suggested meaning. The Peanut application on the receiving wireless mobile unit will interpret this data segment as carrying a message, "HELLO FM MIKE", to be displayed to the user against a gray color background indicating a normal communication to which the originator does not expect a reply communication.

Example 4 of FIG. 5 carries the same message to be conveyed to the user as in example 3. Again, the 0 value in byte 4 indicates that the data segment is a normal message type. However, the 4 value in byte 6 indicates that 4 bytes starting at byte location 7 carry control information that precedes the user message. In this example, bytes 7-10 contain "E006", where the E in byte 7, i.e. a command identification character, indicates that an expiration of the subject message is to be executed (message is to be automatically deleted), 0 in byte 8 indicates expiration in zero days, 0 in byte 9 indicates expiration in zero hours, and the 6 in byte 10 indicates expiration in six minutes. That is, upon the receipt of this data segment by the Peanut application on the destination wireless mobile unit, the subject message, "HELLO FM MIKE", will be conveyed to the user, but all instances of this message will be automatically deleted from recipient mobile unit on the expiration of six minutes. The value 4 in byte 5 indicates the message will be displayed with a gray background conveying a normal communication in which a reply communication by the recipient is not expected.

Example 5 shows an illustrative Peanut application data segment which is similar to example 4 in that the value in byte 6 is not zero indicating that a command in addition to the user messages contained in the data segment. In this example, the 7 in byte 6 indicates that seven bytes starting with byte 7 are associated with command information and precede the beginning of the user data to be conveyed. The L in byte 7 will be interpreted as signifying that the subject data segment is a long message, i.e. the subject user message has too many characters to be contained in only one data segment, thereby requiring fragmentation of the user message into a plurality of message fragments that will be transmitted in a number of data segments. The four bytes, bytes 8-11, collectively comprise a value used to identify each of the required data segments needed to complete the long message. In this example, this value is "0001". The next byte, byte 12, represents the total number of data segments required to complete the long message. In this example, byte 12 has a value of 2 indicating that two data segments are required to complete the single long message. Byte 13 represents the current fragment number of the subject data segment. In this example, byte 13 has a value of 1 indicating that this is the first data segment fragment of the long message in the long message fragments identified as "0001". The first character of the actual user message is in byte 14 with the remaining bytes in the subject data segment carrying further portions of a first message fragment. Example 6 shows the second and last message fragment that completes the long message identified by "0001". Byte 13 of example 6 contains a value of 2 indicating that it is the second in a message fragment series. It is also the last of the message fragment series since byte 12 indicates that the long message is contained in two message fragments. Byte 14 in example 6 contains the first character of user data in this data segment, but corresponds to the next character in the long user message that follows the last character of the user message contained in the preceding data segment represented by example 5. The value 3 in byte 5 in examples 5 and 6 causes the message characters to be displayed against a green screen background on the recipient's device which is intended to convey a normal communication in which a response is expected by the originator.

Example 7 illustrates a data segment that contains two commands. The value 12 in byte 6 indicates that 12 bytes starting with byte 7 are associated with commands. As explained in example 4, the values "E005" in bytes 7-10 indicate a message expiration upon five minutes from the receipt by the Peanut application. The value 255 in byte 11 serves as a predetermined separation character used to separate commands. Similar to example 6, the L in byte 12, which is the first field/character at the beginning of a command string, identifies this data segment as a long message. The bytes 13-16 serve to identify the fragments in series of data segments. Byte 17 has a value of 2 indicating that there are a total of two fragments in the long message series and byte 18 with a value of 1 indicates that this is the first fragment in the series. The first portion of the actual user message follows beginning at byte 19.

Example 8 represents the second fragment of the long message where the first fragment was described in example 7. It will be noted that this data segment contains only a single command associated with the long message fragmentation. That is, the time expiration contained as a first command in the first message fragment is not repeated. In accordance with an embodiment of the present invention, a time expiration command communicated in a first message fragment will automatically be effective for all succeeding fragments of the same long message. Thus, the entirety of the perceived long message will be subject to the time expiration. In this example, the value 7 in byte 5 indicates a command string of seven characters in which: L in byte 7 identifies this segment as a long message type, "0002" in bytes 8-11 identifies the long message fragment series, 2 in byte 12 indicates that the long message consists of two message segments, and the 2 in byte 13 indicates that this is the second fragment in the series of the identified long message, and since there are only two message fragments in this long message, the 2 in byte 13 also indicates that this is the last received fragment in the series. The remaining portion of the user message begins with byte 14 and continues to the conclusion of the user message is contained in this message fragment. The value 1 in byte 5 in examples 7 and 8 will cause the message characters to be displayed on the recipient's screen segment against a red background which is intended by the originator to convey an emergency message requiring immediate attention.

When a message sent from an originator's device using a native message client is received and processed by the destination device using the Peanut ES application, the message is displayed on the destination device's screen with a white background, denoting that this message was received as a public unsecured communication. Previously received messages are stored by the respective ES applications and always displayed with the corresponding background color of its associated priority as determined by byte 5 of the respective message. Preferably, messages being composed and stored by an ES application on an origination device are also displayed on the screen of the origination device by the ES application with the background color selected by the user for the priority of the respective message.

In the above examples of FIG. 5, all of the characters in the various byte positions are shown in a clear text format. In order to preserve security during the transmission of such messages, it is preferred that the majority of each message be sent in an encrypted format. For example, all bytes after byte 3 will preferably be transmitted utilizing a form of encryption. Those skilled in the art will understand that the use of such encryption requires that the receiving wireless mobile device be capable of decrypting the received encrypted characters thus transforming each received message into a corresponding clear text format as illustrated in accordance with FIG. 5.

Figure 6:
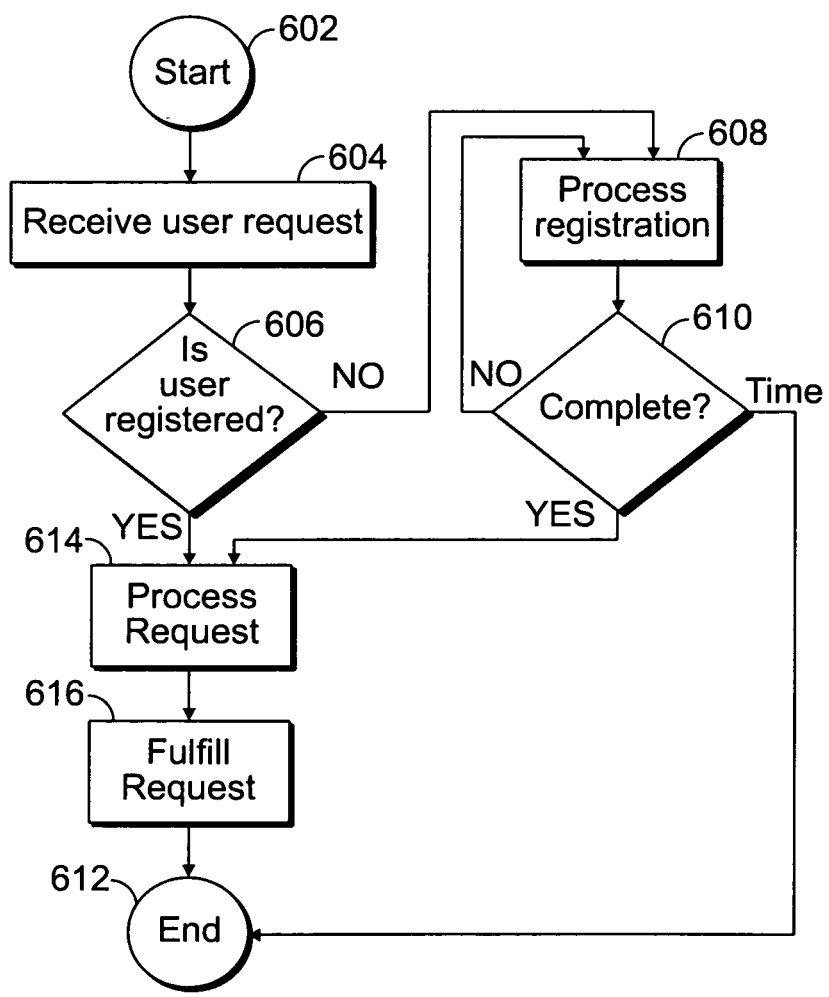
FIG. 6 is a flow diagram illustrating the operation of the mobile services server in accordance with an embodiment of the present invention.

FIG. 6 is an illustrative flow diagram of the operation of the mobile services server in accordance with an embodiment of the present invention. The illustrated process begins with START 602. In step 604 the server receives a user request in the form of a message such as including a command in the format as illustrated in FIG. 5. Upon receiving the user request, a determination is made in step 606 of whether the user is registered. This step may include the services server querying a database storing a list of registered users to determine if the requesting user is registered. A NO determination by step 606, indicating that the requesting user is not registered, results in step 608 beginning a registration process of the subject user. The process may include the transmission of messages between the server and the user's wireless mobile unit by which the server ascertains sufficient information to register the user. In step 610 a determination is made of whether the registration process is complete. A NO determination by step 610 results in further processing by step 608. Should the registration process not be completed within a predetermined time period, step 610 will time out resulting in the termination of the process and the request has indicated at END 612.

A YES determination by step 606 or a YES determination by step 610 results in the user request being processed as indicated by step 614. Processing of the request may include parsing the received request to determine included commands and/or user message components. Such processing is substantially the same as described later with regard to processing of received messages by wireless mobile unit. In step 616, the request is fulfilled. The fulfilling or action taken in response to the request will vary depending upon the nature of the request itself. The action taken may be applicable to the wireless mobile unit that originated the request or to a different wireless mobile unit. For example, a BACKUP request will cause the uploading and storage of user data contained on the requesting mobile unit to the services server. A RESTORE request will cause the stored user data previously obtained during a BACKUP request to be downloaded and installed on the requesting local unit from the services server. However, other commands may initiate actions to be taken at a wireless mobile unit that is not the requesting mobile unit. For example, a DEACTIVATE request received by the services server from a first mobile unit will cause another wireless mobile unit, having an address specified in the request, to be deactivated. Such a request requires user authentication to ensure that the user making the request is the registered owner of the device to which the deactivation request is directed. The process terminates at END 612.

Figure 7:
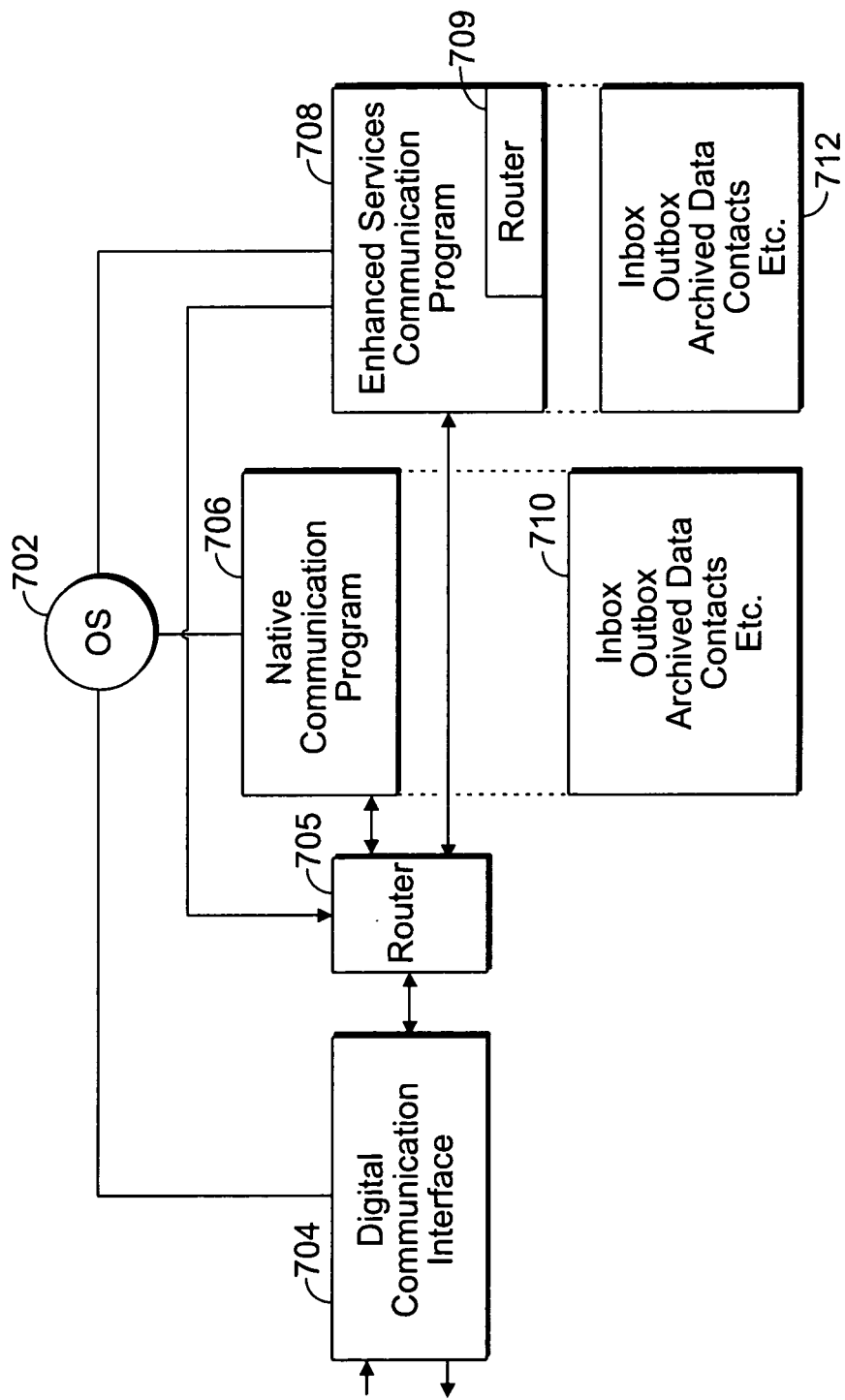
FIG. 7 is a representation of the relationship of application programs operating on a wireless mobile unit that provides enhanced services in accordance with an embodiment of the present invention.

FIG. 7 shows the relationship of programs operating on a wireless mobile unit that provides enhanced services in accordance with an embodiment of the present invention. This shows an overview of the general relationship between the operating system (OS) 702, the digital communication interface 704, router 705, a native communication program 706 and the enhanced services communication program 708. As known to those skilled in the art, a number of different operating systems support the operation of various programs and applications on different wireless mobile units, e.g. Symbian, Android, Apple's iOS, Research In Motion's BlackBerry OS, Microsoft's Windows Phone, etc. The digital communication interface 704 recognizes the transport layer communication protocol, e.g. SMS, MMS, email, etc., used to convey the received information and converts the information provided from the wireless receiver into a digital character string for processing by the native communication program 706 or the enhanced services communication program 708. The digital communication interface 704 also converts a digital character string received from program 706 or 708 into information in the specified transport layer communication protocol provided to the wireless transmitter. Router 705 controls whether the digital communication interface communicates with the native communication program 706, the ES communications program 708, or both based on instructions received from the ES communication program. For example, the user can select via the ES communication program to have all incoming messages sent for processing by both the native communication program 706 and the ES communications program 708. Alternatively, the user can select via the ES communication program to have all incoming messages sent for processing only to the ES communications program 708, which is capable of processing messages received with native formatting or ES application formatting. Choosing the latter is advantageous since the ES application is capable of additional services, e.g. received messages of all formats can be conveniently backed up and later retrieved/restored into the same user device or another device of the user via these features of the ES application.

Native communication program 706 supports a plurality of files and/or records 710, e.g. inbox, outbox, archived data, contacts, etc. The native communication program refers to the communication program originally supplied by the manufacturer or service provider upon the initial acquisition of a wireless mobile unit by a user. The enhanced services communication program 708 is an application program that is typically installed by the user such as by downloading it from the services server or otherwise installing it from an external source. The enhanced services communication program 708 also supports a plurality of files and/or records 712, e.g. inbox, outbox, archived data, contacts, etc. In accordance with an embodiment of the present invention, the user must obtain access to the enhanced services communication program in order to access its supported files and records. Access may be, for example, obtained by entering a user identification and corresponding password in response to user prompts displayed on the screen by the enhanced services communication program upon request to open this program. Interactions between the enhanced services communication program and the native communication program is supported by an application program interface (API) associated with the native communication program and/or supported by the operating system itself.

In the illustrated example, the digital communication interface 704 transmits and receives digital communication strings with both the native communication program 706 and the enhanced services communication program 708. Since communications originated from a wireless mobile unit utilizing the enhanced services communication program is encrypted, the receipt of such an encrypted communication by a destination mobile device will be unintelligible as viewed from a native communication program of the destination mobile device. However, the message may be viewed in clear text format by utilizing the enhanced services communication program on the destination mobile device. For example, a received SMS text message that was transmitted from an enhanced services communication program on the origination mobile device, will appear as a string of unintelligible characters when viewed by the native communication program of a recipient device, except for the leading format indicator "//P:". The same message will be displayed in a clear text format in the inbox of enhanced services communication program (Peanut) on the recipient device.

The enhanced services communication program 708 may include a plurality of modules or sub-programs that support different types of enhanced services, e.g. Peanut "//P:" for messaging, Walnut "//W:" for email, Hazelnut "//H:" for banking, Brazilnut "//B:" for insurance, Chestnut "//C:" for games, Pistachio "//PH:" for healthcare, The Nest "//TN:" for coupons, etc. In support of multiple types of ES, the enhanced services communication program 708 also contains a router module 709 which determines the type of received communication based on the identifying format, i.e. the "//X:" designation, and routes the communication to the corresponding module for processing. This routing is independent of the transport layer communication protocol that was used to convey the incoming communication to the destination communication device.

For example, an incoming SMS message from the user's automobile insurance agent may contain a notice of the date on which the term of the current insurance policy will be expiring and a reminder to pay the premium to keep the policy in effect. This SMS message will have been transmitted from a device using ES originated by the Brazilnut module "//B:" format since the subject matter of the communication deals with insurance. The router module 709 in the recipient's communication device will recognize this ES format and route the corresponding communication to the Brazilnut module for processing. An ES email communication concerning insurance, sent from an originator device using the Brazilnut module, could have been used to convey the same message wherein the router module 709 in the recipient's communication device would route the email communication with a "//B:" format to the Brazilnut module for processing.

Each ES module supports a unique ES format to identify itself and contains its own segregated set of user utilities, i.e. inbox, outbox, etc. That is, each ES module may require a separate user identification and password in order to access the corresponding user utilities, and will have different encryption/decryption requirements than other ES modules. As explained above, encryption is used for ES communications except for the ES format identification. To properly decrypt a received communication into clear text, the incoming communication must be processed by the ES module in the destination user's device that corresponds to the ES module used to originate the communication since each ES module uses a different form of encryption. For example, an incoming Brazilnut communication received by the intended destination device and processed by its Brazilnut module will be decrypted into a clear text message. However, an incoming Brazilnut communication received by the intended destination device if processed by an ES module other than the Brazilnut module would not be properly decrypted into a clear text message since the decryption process would not match the encryption process. Thus, ES communications, even if processed by the intended destination device, will appear as a character string that is not intelligible if processed by the native communication program of the device or by an ES module of a different format. An ES communication if received or intercepted by an unintended destination device will appear as an unintelligible character string since the encryption/decryption process is also unique to the originator/recipient, i.e. the encryption/decryption key includes parameters associated with specific devices/users. Hence, the embodiment of the present invention provides identity management as well as subject matter organization and management.

Figure 8:
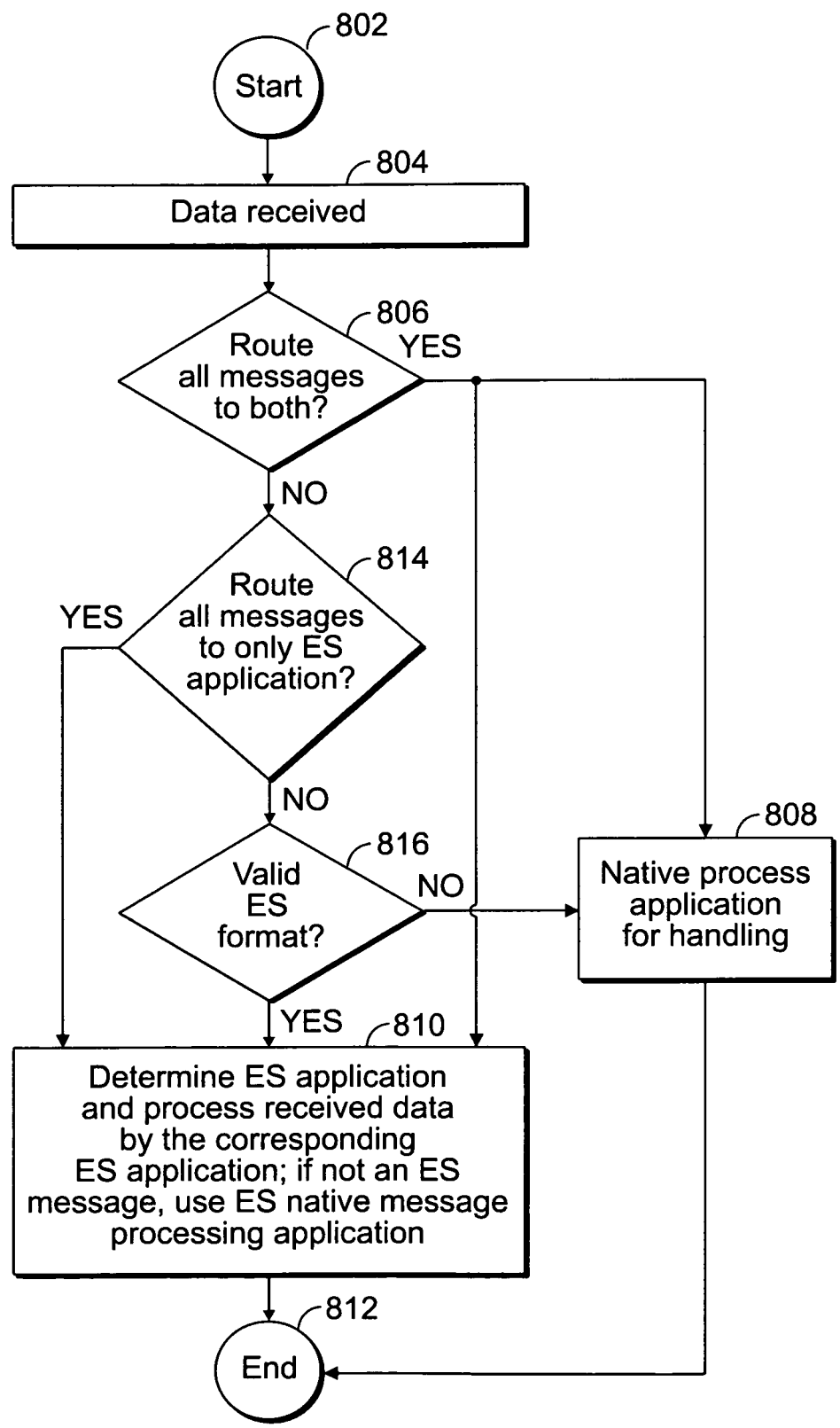
FIG. 8 is a flow diagram of a method practiced by a wireless mobile unit that provides enhanced services in accordance with an embodiment of the present invention.

FIG. 8 shows steps of a method practiced by a wireless mobile unit that provides enhanced services in accordance with an embodiment of the present invention. This process begins at START 802. In step 804 incoming data originated from another wireless mobile unit is received at the subject destination wireless mobile unit. The ES application provides a user selectable input by which the user chooses how received messages are to be processed. That is, the user can select whether to have all messages routed to both ES application and the native application or have all messages routed only to the ES application for processing. This user input selection is stored in memory as part of the ES application in the corresponding communication device and controls how received messages are routed in accordance with the control provided by the ES communication program 708 to the router 705.

A determination is made in step 406 of whether all received messages are to be routed to both the native processing application and the ES application. A YES determination by step 806 causes the received message to be transmitted for processing to both the native processing application 808 and to the ES application 810. A NO determination by step 806, indicating that the user has not selected that all incoming messages be processed by both applications, results in step 814 making a determination of whether the user has selected all incoming messages to be processed only by the ES application. A YES determination by step 814 results and all incoming messages being processed by the ES application at step 810. A NO determination by step 814 results in step 816 making a determination if a valid ES format is present in the received message. For example, a valid ES format can be determined to have been received in a message if the first 4 bytes consist of "//X:" where the X corresponds to one of the valid modules in the ES application. A NO determination by step 816 results in the message being transferred to the native process application for handling as indicated at step 808. A YES determination by step 816, indicating that a valid ES format is present in the received message, results in the message being processed by an ES application at step 810. In step 810, the ES module to be utilized to process the received message is determined based on the "X" as explained above. If a message is received by step 810 for processing that does not contain a valid ES module identification, the ES application will still process the message as a native message in a manner similar to the native process application. However, the native processing provided by the ES application differs from the processing provided by the native application in that the ES application places the resulting message in an inbox of a predetermined default ES module, e.g. the message is displayed to a user in the secure inbox of the Peanut application. An advantage of having the ES application process all of the received messages is that all of the supported ES features, e.g. security, backup, retrieval, restore, etc., is made available for all received messages, even messages that were originated from a user device with native processing. It also permits the user to easily transfer all of the saved messages stored on one handset to another handset, even where the other handset is made by a different manufacturer and/or utilizes a different operating system. Since all received messages are stored only in secure inboxes of the ES application, all received messages are protected by the security provided by the ES application.

Figure 9:
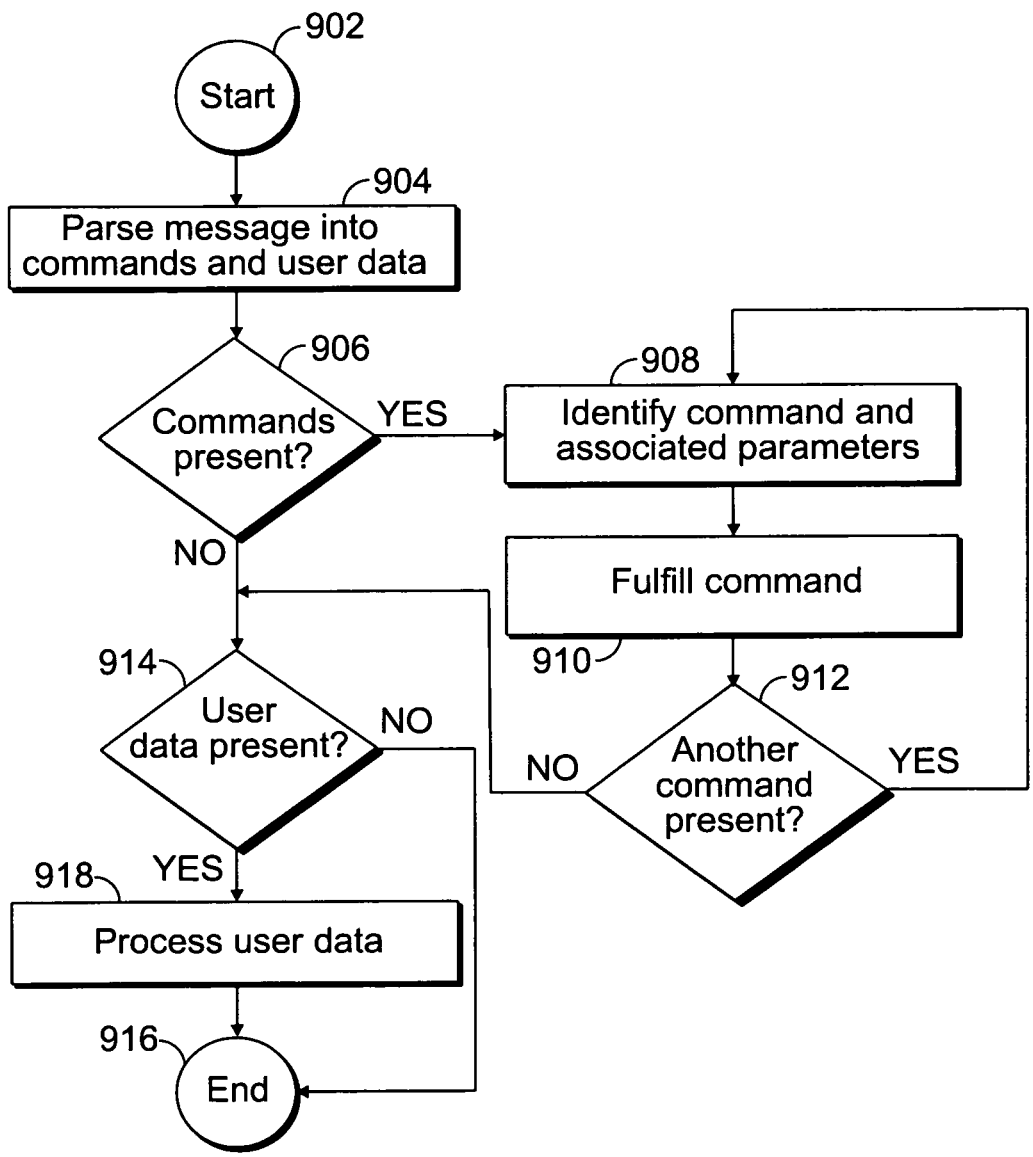
FIG. 9 is a flow diagram of steps utilized by a wireless mobile unit to process a received message in accordance with an embodiment of the present invention.

FIG. 9 shows a flow diagram of steps utilized by a wireless mobile unit to process a received enhanced services message in accordance with an embodiment of the present invention. Beginning with START 902, the received message is parsed into commands and user data in step 904. As explained with regard to FIG. 5, the values contained in bytes 4 and 5 can be used to separate the received message into commands and user data. The message may consist of only commands, only user data, or commands and user data. In step 906 a determination is made of whether commands are present. A YES determination by step 906 results in step 908 identifying a first command and its associated parameters. The type of command is identified by comparing the received command characters with a table of predetermined commands stored in the wireless mobile unit as part of the enhanced services application program. This table also contains a stored list of predetermined parameters associated with the command, where the value of receipt parameters determines the extent or range of an associated action associated with the command. In step 910 the identified command is fulfilled, i.e. depending on the type of command, the command may be immediately executed or scheduled to be executed upon the occurrence of an event or scheduled for execution at a later time. In step 912 a determination is made of whether another command is present in the received message. A YES determination by step 912 results of processing continuing with step 908.

A NO determination by step 906 or a NO determination by step 912 results in step 914 making a determination of whether user data is present in the subject received message. A NO determination by step 914, indicating that no user data is present to be processed, results in the conclusion of processing at END 916. A YES determination by step 914 results in step 918 processing the user data contained in the received message. Typically, in the case of an SMS text message, processing user data includes providing an alert to the user indicating that a message has been received, displaying the received message on the screen of the user's wireless mobile unit along with visual indicia indicating the priority assigned by the originator, and storing the received message as a file or record, e.g. a record in the INBOX of the enhanced services application program. Assuming the message was transmitted as an encrypted format, the message will be decrypted, displayed on the screen with corresponding visual indicia, and stored in the INBOX as a clear text message by the enhanced services application program. The processing that concludes at END 916.

Figure 10:
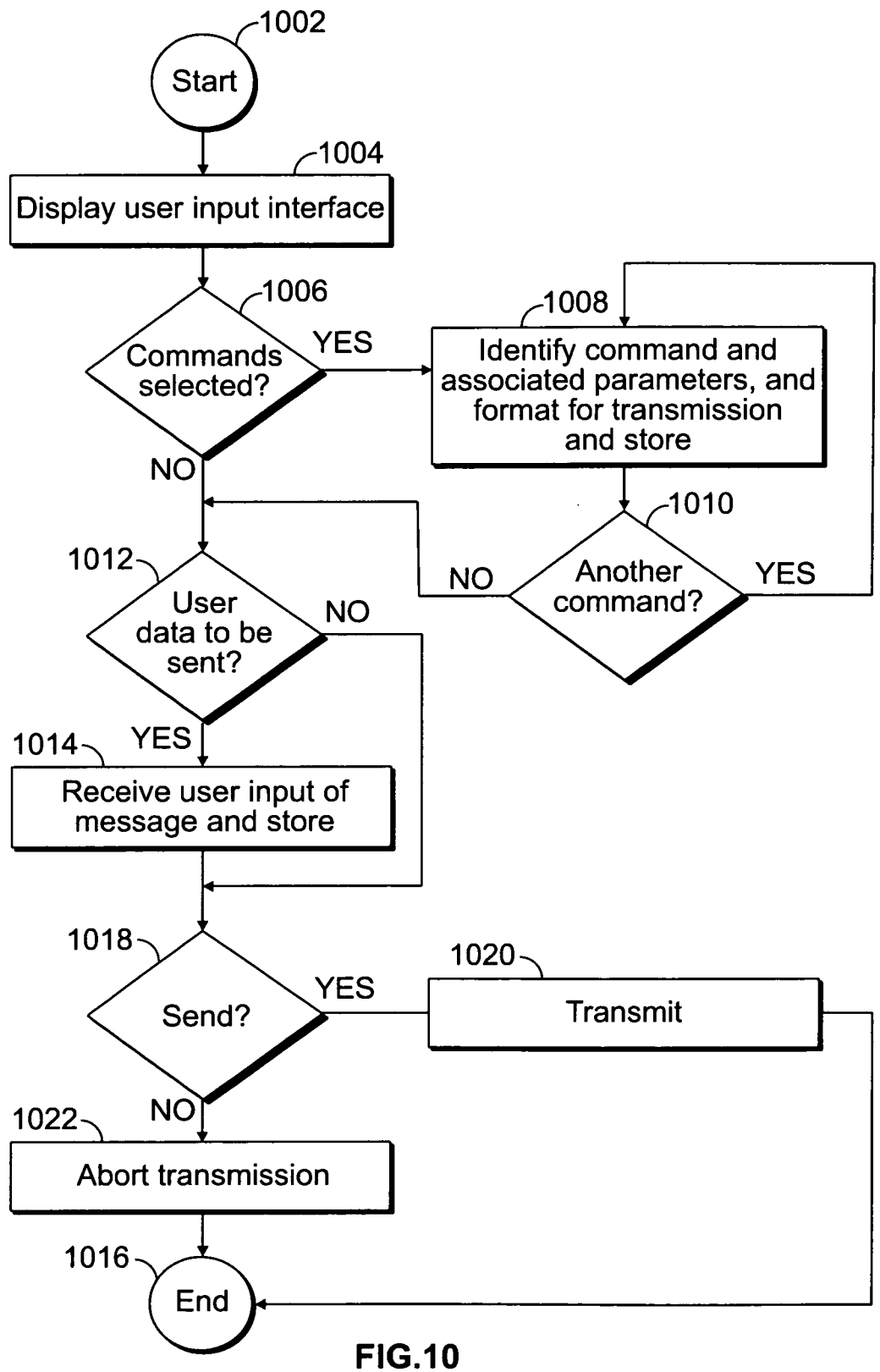
FIG. 10 is a flow diagram of steps utilized by wireless mobile unit associated with the transmission of a message in accordance with an embodiment of the present invention.

FIG. 10 shows a flow diagram of steps utilized by wireless mobile unit associated with the transmission of a message by an ES module of the enhanced services application program in accordance with an embodiment of the present invention. Beginning with START 1002, a user input interface is displayed on the screen of the user's wireless mobile unit for the ES module selected by the user at step 1004. This input interface may consist of graphical user interface with one or more menus each containing a list of items or commands for selection by the user. Alternatively the user may be presented with a blank field in which alphanumeric characters can be entered by the user. Part of the input interface may include the selection of an existing contact or entry of the address of the wireless mobile unit to receive the message being composed. In step 1006 determination is made of whether commands have been selected by the user to be included in the message to be transmitted to another user. A YES determination by step 1006 results in step 1008 identifying the command and its associated parameters to be included in the message, and storing the command in an appropriate format for later transmission. As part of the enhanced services application program, each of the user selectable commands as provided by user input interface is linked to a corresponding command by a table or records stored in the wireless mobile unit as part of the enhanced services application program. As explained with regard to FIG. 5, a first command and its parameters are formatted to occupy a series of bytes beginning with byte 6. In step 1010 determination is made of whether another command is selected by the user to be included in the same message. A YES determination by step 1010 results in step 1008 processing further selected command. Example 7 in FIG. 5 illustrates a second command included in the same message. Formatting of further commands includes inserting a separation character "255" at the byte following a previous command followed by the insertion of the command characters and its parameters. After the insertion of all commands to be transmitted in a single message, the values in byte positions 4 and 5 are determined and inserted as previously explained with regard to FIG. 5.

A NO determination by step 1010 or by step 1006 results in step 1012 making a further determination of whether user data is to be sent as part of the message being composed by the user. A YES determination by step 1012, indicating that user data is to be included, results in step 1014 receiving the user input of the data to be included in the message and storing the user data beginning at the byte position following the last byte of the last command. User input data can be input utilizing a graphical user interface such as from menu selection or by accepting alphanumeric characters entered the user in a predetermined data entry field. For each message, the originating user can select a priority, such as one of the exemplary priorities shown in FIG. 11, that will be assigned to the message. Messages are transmitted with a default priority, e.g. "GRAY", if the originating user does not set a different priority before the message is completed. Following step 1014 or upon a NO determination by step 1012, indicating that no user data is to be included, a determination is made in step 1018 of whether the completed message should be sent. A YES determination by step 1018 results in the composed message being transmitted from the utilized ES module to the destination wireless mobile unit by step 1020. As part of the transmission process, the transmitted message may be stored in the OUTBOX of the corresponding ES module in the originating wireless mobile unit. The process concludes at END 1060. A NO determination by step 1018, indicating that the composed message is not to be transmitted, results in the aborting of the transmission of the message at step 1022 and determination of processing at END 1016.

FIG. 11 shows a table where each row represents a different message priority selectable by the originating user in accordance with an embodiment of the present invention. This information is stored in memory associated with the ES application. The left column shows a value that is placed in byte 5 of the ES format regardless of which ES client application, e.g. Peanut, Walnut, Brazil Nut, etc., is used to transmit the message and regardless of which message format, e.g. SMS, MMS, email, etc., is used. Each ES client application capable of transmitting messages of different message formats. The middle column shows an assigned color for the each priority that will be displayed as the background color against which the alphanumeric characters of the message will be shown to the message recipient. The right column describes the condition that each priority represents.

In addition to displaying a background color indicative of the message priority, the value of the priority byte may be utilized by the ES application for other purposes and functions. For example, the type of encryption/decryption utilized for a message may be determined based on the value of the priority byte, e.g. values 1-4 may be interpreted by the ES application to utilize a default type of message encryption/decryption with the corresponding background colors shown in FIG. 11, while values 5-8 causes the ES application to utilize a different type of message encryption/decryption with the display of the same background colors as for values 1-4, respectively.

Also the value of the priority byte can indicate a message security level, e.g. the value 9 may cause a black background color to be displayed with the message and cause the ES application to utilize a higher level or different encryption/decryption technique such as requiring a dynamic key exchange or a user entered encryption/decryption key in order to encrypt/extract the clear text message. For example, when the originating party selects BLACK as a priority indication, the originator is prompted to enter a password which is used as a custom encryption key to convert clear text message to cipher text that is transmitted to the destination party. On the receiving end, an incoming message with a BLACK priority is received and stored in the cipher text mode. To convert the cipher text message with an associated BLACK priority to clear text, the receiving party will be prompted to enter a password as part of a dynamic key exchange, where the password entered by the receiving party must be the same password used by the originator or a decryption password associated with the encryption password utilized by the originator as part of a linked encryption/decryption key. The described encryption/decryption technique and the storage of the message as cipher text for priority value 9 (BLACK) priority messages differ from the priority values 1-4 and 5-8 in that the encryption/decryption of messages associated with the other priorities is processed automatically in accordance with the ES application and the corresponding messages are displayed and stored in clear text format both at the originating and receiving devices. A received BLACK priority message is stored and displayed as cipher text, and will not be displayed as clear text unless the user enters the required password/key.

Message priorities as implemented by an embodiment of the present invention are ubiquitous. A message of a specified priority, e.g. green, is displayed with the same priority indicia to the recipient regardless of transport layer communication protocol used to transport the message, i.e. whether the message was conveyed via SMS, MMS, email, etc. Further, message priority is uniform across all modules of the ES application so a "red" priority SMS message originated by a Peanut module and a "red" priority SMS message originated by a Brazil Nut module are displayed with the same priority indicia to the recipient even though the received message is processed by different modules of the ES application. The originating device using the ES application saves sent messages with the corresponding priorities and displays sent messages with the same priority indicia as presented to the recipient. Hence, users can easily discern by the display of sent messages the priority that was associated with each.

The wireless mobile unit in one example employs one or more computer-readable signal-bearing tangible media. The computer-readable signal-bearing tangible media store software, firmware and/or assembly language for performing one or more portions of one or more embodiments of the invention. The computer-readable signal-bearing tangible medium may contain stored data in the form of magnetic, electrical, optical, biological, and atomic information. For example, the computer-readable signal-bearing tangible medium comprise floppy disks, magnetic tapes, CD-ROMs, DVD-ROMs, hard disk drives, and electronic memory.

Although exemplary implementations of the invention have been depicted and described in detail herein, it will be apparent to those skilled in the art that various modifications, additions, substitutions, and the like can be made without departing from the spirit of the invention. Although the background color of displayed messages is used to indicate priority in the above examples, any visual indicia indicative of priority could be displayed in association with, e.g. concurrent with, adjacent to, or near, the message. Various types of encoding could be used with the transmission of a message to define the message priority and corresponding visual indicia indicative of its priority. The priority "value" can comprise other than numeric values, e.g. different alphabetic or other characters or symbols that identify corresponding defined priorities.

The scope of the invention is defined in the following claims.

We claim:

1. A method for processing by a first end-user communication device a received electronic communication, the method comprising:

receiving the electronic communication by the first end-user communication device where the electronic communication comprises a digital packet having a header segment and a user data segment, the user data segment containing a user message and a priority value;

determining, by a first module of an enhanced services application program, a first message priority based on the received priority value that defines first visual indicia representing a first priority for the user message, a plurality of different message priorities with associated different visual indicia being defined by corresponding priority values;

the user message in the user data segment being received in an encrypted form;

the priority value identifying one of a plurality of decryption algorithms and decryption keys that is needed to decrypt the encrypted user message to produce clear text information;

processing the encrypted user data segment using said one by the enhanced services application program to extract clear text information represented by the user message, the priority value defining both visual indicia representative of a corresponding user message priority and decryption information needed to extract clear text information represented by the user message;

displaying, under the control of the first module of the enhanced services application program, the user message concurrent with the first visual indicia on a screen segment of the first end-user's communication device so that the first priority assigned to the received user message is visually conveyed to the first end-user.

2. The method of claim 1 wherein the first visual indicia is a first color that is displayed in association with the screen segment, other priority values having corresponding other visual indicia represented by other colors.

3. The method of claim 1 further comprising the steps of:
storing records in first end-user communication device memory that identify for each of the plurality of different priority values corresponding information that defines the visual indicia to be displayed for the respective priority values;
comparing the priority value in the received electronic communication to the priority values in the stored records to determine the corresponding information that defines the visual indicia to be displayed in association with the user message.

4. The method of claim 1 further comprising the step of:
the received electronic communication being received via one of a plurality of possible transport layer communication protocols comprising short messaging service (SMS) text messaging, multimedia messaging service (MMS), hypertext transfer protocol (HTTP) messaging service and email protocols;
displaying, under the control of the first module of the enhanced services application program, the user message concurrent with the first visual indicia on a screen segment of the first end-user's communication device so that the first priority assigned to the received user message is displayed to the first end-user with the same visual representation regardless of which one of the plurality of possible transport layer communication protocols carried the electronic communication.

5. The method of claim 1 wherein;
the first module of an enhanced services application program comprises one of a plurality of modules in the enhanced services application program, and a first label in the user data segment identifies a corresponding module of the enhanced services application to process the electronic communication;
said plurality of different message priorities with associated different visual indicia represented by corresponding priority values being used for all of the modules in the enhanced services application program so that a certain priority value will cause the display of the same visual indicia regardless of which of the modules processes the electronic communication.

6. A computer program product, comprising a computer usable tangible non-transitory medium having a computer readable program code embodied therein, said computer readable program code adapted to be executed to implement a method for processing an electronic communication received by a first end-user communication device, the method comprising:
receiving the electronic communication by the first end-user communication device where the electronic communication comprises a digital packet having a header segment and a user data segment, the user data segment containing a user message and a priority value;
determining, by a first module of an enhanced services application program, a first message priority based on the received priority value that defines first visual indicia representing a first priority for the user message, a plurality of different message priorities with associated different visual indicia being defined by corresponding priority values;
the user message in the user data segment being received in an encrypted form;
the priority value identifying one of a plurality of decryption algorithms and decryption keys that is needed to decrypt the encrypted user message to produce clear text information;
processing the encrypted user data segment using said one by the enhanced services application program to extract clear text information represented by the user message, the priority value defining both visual indicia representative of a corresponding user message priority and decryption information needed to extract clear text information represented by the user message;
displaying, under the control of the first module of the enhanced services application program, the user message concurrent with the first visual indicia on a screen segment of the first end-user's communication device so that the first priority assigned to the received user message is visually conveyed to the first end-user.

7. The computer program product of claim 6 wherein the first visual indicia is a first color that is displayed in association with the screen segment, other priority values having corresponding other visual indicia represented by other colors.

8. The computer program product of claim 6 further comprising:
storing records in first end-user communication device memory that identify for each of the plurality of different priority values corresponding information that defines the visual indicia to be displayed for the respective priority values;
comparing the priority value in the received electronic communication to the priority values in the stored records to determine the corresponding information that defines the visual indicia to be displayed in association with the user message.

9. The computer program product of claim 6 further comprising:
the received electronic communication being received via one of a plurality of possible transport layer communication protocols comprising short messaging service (SMS) text messaging, multimedia messaging service (MMS), hypertext transfer protocol (HTTP) messaging service and email protocols;
displaying, under the control of the first module of the enhanced services application program, the user message concurrent with the first visual indicia on a screen segment of the first end-user's communication device so that the first priority assigned to the received user message is displayed to the first end-user with the same visual representation regardless of which one of the plurality of possible transport layer communication protocols carried the electronic communication.

10. The computer program product of claim 6 wherein;
the first module of an enhanced services application program comprises one of a plurality of modules in the enhanced services application program, and a first label in the user data segment identifies a corresponding module of the enhanced services application to process the electronic communication;
said plurality of different message priorities with associated different visual indicia represented by corresponding priority values being used for all of the modules in the enhanced services application program so that a certain priority value will cause the display of the same visual indicia regardless of which of the modules processes the electronic communication.

11. An end-user wireless communication device that processes a received electronic communication, the device comprising:

a microprocessor apparatus receives the electronic communication where the electronic communication comprises a digital packet having a header segment and a user data segment, the user data segment containing a user message and a priority value;

the microprocessor apparatus determines, by a first module of an enhanced services application program, a first message priority based on the received priority value that defines first visual indicia representing a first priority for the user message, a plurality of different message priorities with associated different visual indicia being defined by corresponding priority values;

the user message in the user data segment being received in an encrypted form;

the microprocessor apparatus using the priority value to identify one of a plurality of decryption algorithms and decryption keys that is needed to decrypt the encrypted user message to produce clear text information;

the microprocessor apparatus processing the encrypted user data segment using said one by the enhanced services application program to extract clear text information represented by the user message, the priority value defining both visual indicia representative of a corresponding user message priority and decryption information needed to extract clear text information represented by the user message;

the microprocessor apparatus causing the display, under the control of the first module of the enhanced services application program, the user message concurrent with the first visual indicia on a screen segment of the first end-user's communication device so that the first priority assigned to the received user message is visually conveyed to the first end-user.

12. An end-user wireless communication device of claim 11 wherein the first visual indicia is a first color that is displayed in association with the screen segment, other priority values having corresponding other visual indicia represented by other colors.

13. An end-user wireless communication device of claim 11 further comprising:

the microprocessor apparatus storing in memory of the end-user wireless device records that identify for each of the plurality of different priority values corresponding information that defines the visual indicia to be displayed for the respective priority values;

the microprocessor apparatus comparing the priority value in the received electronic communication to the priority values in the stored records to determine the corresponding information that defines the visual indicia to be displayed in association with the user message.

14. An end-user wireless communication device of claim 11 further comprising:

the received electronic communication being received via one of a plurality of possible transport layer communication protocols comprising short messaging service (SMS) text messaging, multimedia messaging service (MMS), hypertext transfer protocol (HTTP) messaging service and email protocols;

the microprocessor apparatus causing the display, under the control of the first module of the enhanced services application program, the user message concurrent with the first visual indicia on a screen segment of the first end-user's communication device so that the first priority assigned to the received user message is displayed to the first end-user with the same visual representation regardless of which one of the plurality of possible transport layer communication protocols carried the electronic communication.

15. An end-user wireless communication device of claim 11 wherein:

the first module of an enhanced services application program comprises one of a plurality of modules in the enhanced services application program, and a first label in the user data segment identifies a corresponding module of the enhanced services application to process the electronic communication;

said plurality of different message priorities with associated different visual indicia represented by corresponding priority values being used for all of the modules in the enhanced services application program so that a certain priority value will cause the display of the same visual indicia regardless of which of the modules processes the electronic communication.

* * * * *